United States Patent [19]

Ala-Huikku et al.

[11] Patent Number: 5,324,698

[45] Date of Patent: Jun. 28, 1994

[54] NEW CARRIER CATALYST FOR THE POLYMERIZATION OF ETHYLENE

[75] Inventors: Sirpa Ala-Huikku, Helsinki; Ulf Palmqvist, Porvoo; Marjaana Lommi, Kulloo; Eero Iiskola, Porvoo, all of Finland

[73] Assignee: Neste Oy, Espoo, Finland

[21] Appl. No.: 947,967

[22] Filed: Sep. 21, 1992

Related U.S. Application Data

[63] Continuation of Ser. No. 577,321, Sep. 4, 1990, abandoned.

[30] Foreign Application Priority Data

Sep. 6, 1989 [FI] Finland ................................ 894216

[51] Int. Cl.$^5$ ...................... C08F 4/654; C08F 4/636; C08F 10/00
[52] U.S. Cl. ................................ 502/126; 502/120; 502/115; 502/121; 502/125; 502/127; 526/125; 526/348.4; 526/352
[58] Field of Search ............... 502/120, 126, 127, 115, 502/121

[56] References Cited

U.S. PATENT DOCUMENTS

| | | | |
|---|---|---|---|
| 4,107,413 | 8/1978 | Giannini et al. | 526/906 |
| 4,107,414 | 8/1978 | Giannini et al. | 526/906 |
| 4,175,170 | 11/1979 | Schweier et al. | 526/125 |
| 4,290,918 | 9/1981 | Bayer et al. | |
| 4,314,911 | 2/1982 | Giannini et al. | 526/125 |
| 4,383,095 | 10/1983 | Goeke et al. | |
| 4,544,717 | 10/1985 | Mayr et al. | 526/125 |
| 4,684,703 | 8/1987 | Wagner et al. | 526/125 |

FOREIGN PATENT DOCUMENTS 8810275 12/1988 PCT Int'l Appl. .
1348655 3/1974 United Kingdom .

OTHER PUBLICATIONS

Supinski, 111:79677t Manufacturer of Diene Rubbers in the Preparation of Syndiotactic Polystyrene.

*Primary Examiner*—Edward J. Smith
*Attorney, Agent, or Firm*—Tilton, Fallon, Lungmus & Chestnut

[57] ABSTRACT

A problem in the conventional olefin polymerization catalyst systems, the procatalysts of which are based on a solid carrier and a titanium compound and an electron donor on its surface, is that unsufficiently high activities are achieved by the morphology of the carrier. Moreover, the active age of such a catalyst in the polymerization is too short. These problems have now been solved by the olefin polymerization catalyst system according to the invention, the procatalyst of which comprises a solid carrier and a layer on its surface consisting of a titanium compound, a magnesium compound and an electron donor. The advantages of the invention become more emphasized when using monocyclopentadienyl titaniumtrichloride as the titanium compound.

2 Claims, No Drawings

NEW CARRIER CATALYST FOR THE POLYMERIZATION OF ETHYLENE

This application is a continuation of U.S. patent application Ser. No. 07/577,321 filed Dec. 4, 1990, now abandoned.

The invention relates to the polymerization catalyst system of olefins, the procatalyst of which comprises a solid carrier and of a layer on its surface comprising a titanium compound, a magnesium compound and an electron donor. The invention also relates to a method for the preparation of such a catalyst system and to the use of the catalyst system for the polymerization and copolymerization of alphaolefins.

For the polymerization of olefins is generally used a so-called Ziegler-Natta-catalyst system consisting of a so-called procatalyst and a cocatalyst. The procatalyst is based on a compound of a transition metal belonging to any of the groups IVB to VIII of the periodic table of elements and the cocatalyst is based on an organometallic compound of a metal belonging to any of the groups IA to IIIA of the periodic table. The catalyst system usually also comprises electron donors improving and modifying the catalytic properties.

In the preparation of heterogenic polymerization catalysts it is conventional to use as a component improving the polymerization activity of the procatalysts a carrier compound, on which the transition metal compound is layered. Common carrier compounds are silicon dioxide, aluminum oxide, magnesium oxide, titanium oxide, carbon in different forms, and different kinds of polymers. As important carrier compounds have proven magnesium compounds, such as alkoxides, hydroxides, hydroxyhalides and halides, of which the last-mentioned, especially magnesium dichloride, has lately grown to the most significant carrier component of the procatalyst compositions.

As magnesium halogenides do not in their basic crystal for become activated very efficiently by the transition metal compound, their crystal structure must be deformed. Conventionally this takes place by grinding e.g. in a ball mill, whereby finely-divided powder having typically a great specific area is obtained, the crystal lattice of which is greatly deformed. When such a powder is activated to a procatalyst composition by layering it with a transition metal compound and thereafter is reduced with a organometallic compound acting as a cocatalyst, a very active polymerization catalyst is obtained.

A drawback of the conventional grinding methods of magnesium halogenide is, however that they consume very much energy, cause wear and corrosion of the equipment and are suitable for the preparation of a catalyst by a laborious batch process only.

A newer and more efficient manner to decrease the crystallinity of magnesium halogenides and thus improve their ability to become activated by a transition metal compound, is to modify them chemically. Hereby the magnesium halide, the electron donor and the transition metal compound are, often in a solution, reacted with each other to form procatalyst compositions which can be easily separated.

In the U.S. Pat. Nos. 4,124,532 and 4,174,429 the preparation of this kind of catalytically active complexes by reacting in a suitable ratio the magnesium halide and the transition metal compound in an electron donor solution is described. The finished complex can be separated by evaporation crystallization of the solution mentioned or by precipitation of the complex with a solution in which it does not dissolve. As such complex compounds are produced as a result of a spontaneous crystallization they have a very regular crystal structure, which, simultaneously is disadvantageous for the polymerization.

In the U.S. Pat. No. 4,302,566 and the EP application 6110 a precursor formed by magnesium halogenide, a transition metal compound and an electron donor is disclosed. The precursor is formed by precipitation from an electron donor solution, after which it is separated and agitated together with an aluminum alkyl, which activates it, and a separate inert carrier. The U.S. Pat. No. 3,989,881 discloses the polymerization of ethylene with a procatalyst prepared by precipitating from tetrahydrofurane solution together the tetrahydrofurane complex of magnesium dichloride and the tetrahydrofurane complex of titanium trichloride.

(Co)polymerization of ethylene in a gas phase by means of highly active catalysts is known through the U.S. Pat. Nos. 4,482,687; 4,383,095; 4,354,009; 4,349,648 and 4,359,561 and from EP publications 120503, 91135, 80052, 43220 and 20818. These catalysts are prepared from an organic aluminium compound and a precursor. Precursors have been used for the impregnation of porous inert carriers, such as silicon dioxide. A typical precursor composition is:

$(Mg)_m Ti(OR)_n X_p (ED)_q$, in which R is an aliphatic or aromatic hydrocarbon group having 1 to 14 carbon atoms or a group COR', in which R' is an aliphatic or aromatic hydrocarbon radical having 1 to 14 carbon atoms, X is Cl, Br and/or I and ED is an organic electron donor compound, such as an alkyl ester of an aliphatic or aromatic acid, an aliphatic ether, a cyclic ether or an aliphatic ketone. It should be noted that the precursor according to the formula is not formed of titanium alkyls $Ti(R)_n$, or alkyl halides $Ti(R)_n X_p$, but of titanium alkoxy halogenides $Ti(OR)_n X_p$.

On the other hand, the most various titanium compounds have been experimented for the improvement of the Ziegler-Natta-catalyst system. Thus, bis(cyclopentadienyl)titanium dichloride (Cp$_2$TiCl2) has been used for the preparation of homogeneous polymerization catalysts.

In the U.S. patent specification the use of a non-supported monocyclopentadienyltitanium trichloride together with a triethylaluminium cocatalyst for the polymerization of ethylene is described.

In addition to the fact that carrier has not been used in the publication, neither the activity of the catalyst nor the properties of the polymer have been given.

The purpose of the present invention is to provide a procatalyst consisting of a titanium compound, a magnesium compound and an electron donor having an as amorphous structure as possible and being thus as active as possible. A further aim of the invention is to provide a procatalyst having a polymerization lifetime as long as possible. A further goal is to provide a method for the preparation of a solid procatalyst of an olefin polymerization catalyst system which takes place without a separate grinding step of the magnesium halogenide. In the invention it is, moreover, strived for finding a most appropriate use for the new procatalyst composition in the polymerization or copolymerization of olefins.

These goals have been achieved by an olefin polymerization catalyst system, a method for its preparation and a use thereof, characterizing of which is what is stated in the characterizing clause of the corresponding independent claims.

The invention is based on the realization that the alteration of the morphology of the magnesium halide, being a condition of the activity, is performed by impregnating a separate, inert carrier with a suitable electron donor solution of magnesium halide. Another realization essentially connected with the invention is that by choosing a suitable titanium compound, i.e. monocyclopentadienyl titaniumtetrachloride, a more active procatalyst having a more usable effective time is obtained.

The olefin polymerization catalyst system according to the present invention consists of a procatalyst and a cocatalyst. The protection applied for expressly relates to a procatalyst comprising a solid carrier and a layer on its surface consisting of a titanium compound, a magnesium compound and an electron donor. The invention works particularly well when the titanium compound is monocyclopentadienyl titanium trichloride.

The solid carrier can be any organic or inorganic substance, which can be impregnated with the electron donor solution of the titanium compound mentioned and the magnesium compound and, which in the continuation does not disturb the activation with the transition metal compound. Of the organic carriers polymers can be stated and of the inorganic e.g. silicon dioxide, aluminium oxide, magnesium oxide, magnesium silicate, titanium oxide, etc. Particularly advantageous carriers are silicon dioxide, aluminium oxide and magnesium silicate or a mixture thereof. The most advantageous is silicon dioxide.

It is preferable to heat the last-mentioned inorganic carriers to a temperature of about 200° to 1000° C. for the removal of the water contained therein. If there are hydroxyl groups or the like on the surface of the original carrier, it is, furthermore, preferable to treat them chemically e.g. with aluminium alkyl or its derivatives, zinc alkyl, e.g. $ZnR_2$, an organosilicon compound, a phosphorus compound or a fluorine compound for the removal of surface hydroxy or the like. Typical aluminium alkyl compounds are $AlR_3$, $AlR_2X$, $Al(i-Bu)_3$, $Al(i-Bu)_2H$, in which R means an alkyl group and X means a halogen. Suitable organosilicon compounds are $(R_3Si)_2NH$, $R_nSiX_{4-n}$, preferable phosphorus compounds $PX_3$, $POX_3$, $P(OR)_3$, $R_2PX$, $RPX_2$, $(R_2N)_2POX$ and suitable fluorine compounds are $F_2$, HF, $BF_3$, $SiF_4$, $SOF_2$.

The magnesium compound used in the invention is particularly magnesium halide, in which the halide is chlor, brom, iodine or a mixture thereof. The most preferable magnesium halide is anhydrous and dry magnesium dichloride, $MgCl_2$.

A requirement of the electron donor is that essential amounts monocyclopentadienyl titaniumtrichloride and a magnesium compound like and magnesium dichloride is dissolved in it. Moreover, the electron donor must act as a modifier of the active centers and the morphology of the catalyst so that the activity and the lifetime of the catalyst are improved. Such electron donors are preferably the alkyl esters of aliphatic or aromatic carboxylic acids, aliphatic ethers, cyclic ethers, or aliphatic ketones. The electron donor can be used either alone or as a combination of several electron donors.

As a cocatalyst of the catalyst system according to the invention can be used an organometallic compound of a metal of any of the groups IA to IIIA of the periodic table, such as trialkylaluminium or alkylaluminium halide or alkylaluminium sesquihalide. Particularly preferable are trialkylaluminium and alkylaluminium halides.

The present invention also relates to a method for the preparation of a solid procatalyst of an olefin polymerization catalyst system, in which the solid carrier is impregnated with a solution that has been obtained by dissolving a magnesium compound and a monocyclopentadienyl titaniumtrichloride into a compound having the properties of an electron donor.

In the method the carrier, such as silicon dioxide, aluminium oxide or magnesium silicate, is first dehydrated preferably by heating it to a temperature of 200° to 1000° C. Thereafter it can, if necessary, be treated with aluminium alkyl, zinc alkyl, organosilicon, phosphorus or fluorine compounds of the above-mentioned type for the removal of the surface hydroxyl groups or the like. This chemical treatment takes place preferably by suspending the solid carrier into hydrocarbon and by adding the treating chemical mentioned to the suspension. After the treatment the suspension is dried to powder.

Such a calcination and/or chemical treatment of a carrier can be carried out for any of the various carriers mentioned, but it is particularly suitable for the pretreatment of silicon dioxide. Such a pretreated carrier can thereafter be treated with a suitable procatalyst precursor.

The precursor is prepared by dissolving monocyclopentadienyl titaniumtrichloride and a magnesium compound like magnesiumhalogenide into an electron donor compound of the above-mentioned type. The dissolving takes place at need by agitation at a temperature which is between 20° C. and the boiling point of the electron donor compound.

The monocyclopentadienyl titanium trichloride can be added to the electron donor compound either before the magnesium compound, simultaneously with it or after it.

Then the carrier is impregnated with the precursor solution. The carrier is added to the impregnation solution preferably in the form of a dry powder. The particle size of the powder is preferably 20 to 100 μm and it is preferably selected so that the particle size distribution is as narrow as possible. After the impregnation, which, at need, is carried out at elevated temperature, the electron donor surplus is removed e.g. by evaporation at a temperature between 20° to 150° C.

The procatalyst of the obtained olefin polymerization catalyst system preferably has the following molar ratios: Ti/Mg=0.1 to 1.0; Cl/Mg=2.5 to 6 and electron donor (calculated as tetrahydrofurane)/Mg=0.5 to 4.5.

In the experiments carried out in connection with the invention it could, surprisingly, be noted that the performing capacity and the lifetime of the catalyst prepared in the above-described manner were excellent and that it was particularly suitable for the polymerization of ethylene with high activity and good hydrogen and comonomer sensitivity.

Finally, the invention relates to the use of a polymerization catalyst system having a procatalyst of the above-mentioned type for the (co)polymerization of olefins and preferably ethylene.

The cocatalyst is hereby an organometallic compound of a metal belonging to any of the groups IA to IIIA of the periodic table of elements, preferably an organoaluminium compound. Hereby, a separate preactivation can be carried out for the procatalyst with such an organic aluminium compound before it is added to the polymerization reactor and finally activated. Suitable preactivation substances are e.g. organoaluminium compounds having the formula $AlR_3$, $AlR_2X$, $Al_2R_3X_3$ and $Al_2R_4O$, in which R is an alkyl and X a halogen.

The final activation preferably takes place in a reactor so that the total molar raio of aluminium and titanium is equivalent to or greater than 20. The activation of a procatalyst can take place either in one or two stages.

The new Ziegler-Natta-catalyst according to the invention differs as to its properties from the prior art Ziegler-Natta-catalysts mainly in that it has a longer lifetime in the polymerization reactor and at least as good an activity, comonomer susceptibility, and morphology and at least as narrow a molecular distribution. The polymers obtained thereby have a wider melt index range (with the catalyst according to the invention the melt index values rise more when the hydrogen partial pressure is increased). Moreover, the monocyclopentadienyl titanium trichloride used in the new catalyst system is more stable and less toxic and corrosive than the titanium tetrachloride according to the prior art.

The preparation and comparison examples disclosed in the following will illustrate the invention.

THE PREPARATION OF THE CATALYST

Example 1

A. Treatment of the carrier with alkylaluminium 6.0 g of silicon dioxide, the Davison degree of which was 955 and which was had been dehydrated at 600° C., was suspended into 36 ml of pentane. The suspension was agitated and to it was added 5.13 ml of 10% by weight pentane solution of triethylaluminium. The mixture obtained was agitated for 15 minutes and dried in nitrogen flow at room temperature for 2 hours, whereby dry, freely flowing powder containing 5.5% by weight of alkylaluminium, was formed.

B. Preparation of the precursor

To a 250 ml flask furnished with a reflux cooler and a mechanical mixer was fed 500 mg of anhydrous magnesiumdichloride, 384 mg of monocyclopentadienyl titanium trichloride and 30 ml of tetrahydrofurane. The mixture was held at 60° C. for 30 minutes for a complete dissolution of the substance.

C. Impregnation of silicon dioxide with the precursor

A homogeneous precursor solution was transferred by siphoning on silicon dioxide treated with aluminium alkyl. The suspension obtained was agitated for 15 minutes and dried at 85° C. (temperature of the bath) in a nitrogen flow for 4 hours.

The composition of the catalyst was: Mg 1.45%, Ti 0.97%, Al 1.03%, Cl 6.2%, THF 6.3%.

Example 2

The procedure was as in example 1, except that the catalyst was dried at 140° C. (temperature of the bath) for 2.5 hours.

The composition of the catalyst was: Mg 1.6%, Ti 0.89%, Al 1.91%, Cl 6.2%, THF 4.9%.

Example 3

The procedure was as in example 1, except that the dehydrated silicon dioxide was treated with 9.34 ml of 10% by weight pentane solution of triethylaluminium for obtaining a carrier powder containing 10% by weight of alkyl aluminum.

The composition of the catalyst was: Mg 1.6%, Ti 0.87%, Al 2.0%, Cl 8.6%, THF 6.4%.

Example 4

The procedure was as in example 2, except that the dehydrated silicon dioxide was treated with 9.34 ml of 10% by weight pentane solution of triethylaluminium for obtaining a carrier powder containing 10% by weight of alkyl aluminum.

The composition of the catalyst was: Mg 1.5%, Ti 0.9%, Al 1.9%, Cl 6.1%, THF 3.2%.

THE COMPARISON CATALYST

The comparison catalyst was prepared in the same manner as the catalyst in Example 1. The only difference was that instead of monocyclopentadienyl titaniumtrichloride titanium tetrachloride (0.19 ml) was used.

The composition of the catalyst was: Mg 1.3%, Ti 0.93%, Al 1.1%, Cl 7.7%, THF 6.5%.

PREACTIVATION WITH COCATALYST

All the catalysts according to the examples 1 to 4 and the comparison example were preactivated in the following manner: 0.5 to 2 g of procatalyst was suspended in 3 ml of pentane and mixed as 10% by weight pentane solution of alkyl aluminium was added to it. The molar ratio of the aluminium compound and the tetrahydrofurane was in the catalyst 0.8 to 1.2. The mixture was agitated at room temperature in nitrogen flow for about 20 minutes. The temperature of the bath was raised to 40° C. and the procatalyst was dried for one hour.

POLYMERIZATION

1. Experimental polymerization of ethylene

To a 3 liter reactor was added 2.1 liter of n-pentane dried with aluminium oxide and molecule sieves. Then 200 mg of procatalyst suspended into a small amount of pentane was added through a feeding funnel to the reactor and the temperature was raised to 80° C.

A 0.5 liter vessel was pressurized with hydrogen to a pressure of 5 bars. This hydrogen amount was fed together with the 10% by weight pentane solution of triethylaluminium acting as a cocatalyst and the ethylene gas acting as the monomer into the reactor. The total pressure was raised by means of ethylene to 15 bars, the temperature was raised to 90° C. and the polymerization was continued for 60 to 90 minutes. Ethylene was continuously fed into the reactor to keep the pressure constant.

2. Copolymerization

The copolymerization of ethylene and alpha-olefins was carried out in the same manner as the polymerization, except that the comonomer (300 ml of 4-methyl-1-pentene) was added into the medium (1800 ml of n-pentane) immediately after the addition of the catalyst suspension.

The polymerization results obtained with the catalyst systems prepared according to the examples 1 to 4 and the comparison example have been presented in the table.

3. Experiments for the determination of the age of the catalyst

A procatalyst (=catalyst 1) preactivated with diethylalumi chloride cocatalyst (Al/THF=0.8) prepared according to example 1 and the comparison procatalyst were tested with ethylene, whereby 30 mg of procatalyst and 2 ml of 10% by weight pentane solution of triethylaluminium as the main cocatalyst was used. The polymerizations were carried out as described above, except that the polymerizations were allowed to go on for a longer time.

On the catalyst 1 polymerization of ethylene was continued for 6.5 hours. Hereby the yield of the polyethylene was 290 g. The consumption of ethylene gas remained constant throughout the whole polymerization time. In the case of the comparison catalyst the consumption of ethylene decreased as a function of the polymerization time and the catalyst remained active only for 4.4 hours. The yield of the polyethylene was 176 g.

We claim:

1. An olefin polymerization catalyst system comprising a procatalyst and a co-catalyst, the procatalyst of which comprises a solid inorganic carrier with a layer of a titanium compound, a magnesium compound and an electron donor on its surface, which procatalyst has been made by impregnating the solid inorganic carrier with a solution of monocyclopentadienyl titanium trichloride and a magnesium dichloride in tetrahydrofuran and then drying by evaporating the tetrahydrofuran surplus wherein the molar ratios of the procatalyst are the following: Ti/Mg=0.1 to 1.0; Cl/Mg=2.5 to 6 and tetrahydrofuran/Mg=0.5 to 4.5 and the co-catalyst is a trialkyl aluminum.

2. An olefin polymerization catalyst system according to claim 1, wherein the solid carrier is silicon dioxide, aluminum oxide or magnesium (silicate or a mixture thereof, which has been heated to a temperature of about 200° to 1000° C. and/or chemically treated with aluminum alkyl or its derivative, zinc alkyl, an organosilicon compound, a phosphorus compound or a fluorine compound for the removal of surface hydroxyls.

* * * * *

TABLE

| | Example 1 | | | (*) | Examp. 2 | Examp. 3 | Examp. 4 | Comparison catalyst | |
|---|---|---|---|---|---|---|---|---|---|
| Al-alkyl content of silicon dioxide | 5.5% | 5.5% | 5.5% | 5.5% | 5.5% | 10% | 10% | 5.5% | 5.5% |
| Drying temperature of catalyst (bath) | 85° C. | 85° C. | 85° C. | 85° C. | 140° C. | 85° C. | 140° C. | 85° C. | 85° C. |
| Preactivation substance Al/THF | DEAC | DEAC | DEAC | DEAC | DEAC | DEAC | DEAC | DEAC | DEAC |
| mol/mol | 0.8 | 0.8 | 1.2 | 1.2 | 0.8 | 0.8 | 0.8 | 0.8 | 0.8 |
| Activation substance | TEA | TEA | TEA | TEA | TEA | TEA | TEA | TEA | TEA |
| Total-Al/Ti mol/mol | 84 | 84 | 72 | 72 | 89 | 74 | 61 | 75 | 75 |
| Catalyst g | 0.2 | 0.2 | 0.2 | 0.2 | 0.2 | 0.2 | 0.2 | 0.2 | 0.2 |
| Polymerization time hours | 1.5 | 1.5 | 1.0 | 1.0 | 1.5 | 1.5 | 1.5 | 1.5 | 1.5 |
| H2-pressure 0.5 liter vessel, bar | 5 bar | 10 bar | 5 bar | 5 bar | 5 bar | 5 bar | 5 bar | 5 bar | 10 bar |
| PE g | 554 | 213 | 330 | 170 | 427 | 193 | 245 | 538 | 312 |
| Activity kg PE/g Ti | 322 | 124 | 165 | 85 | 267 | 134 | 102 | 274 | 159 |
| Bulk density kg/m$^3$ | 320 | 310 | 340 | 340 | 330 | 350 | 320 | 350 | 320 |
| MI(21.6) | 8.1 | 148.9 | 12.8 | 14.2 | 11.6 | 8.9 | 3.7 | 17.7 | 90.2 |
| MI(2.16) | 0.3 | 4.89 | 0.46 | 0.57 | 0.40 | 0.32 | 0.14 | 0.65 | 3.38 |
| Melt flow ratio | 27.24 | 30.4 | 27.76 | 25.1 | 29.0 | 27.78 | 26.5 | 27.08 | 26.73 |
| Mw | 226 000 | 96 900 | 194 000 | 164 500 | 186 500 | 218 500 | 314 500 | | |
| Mw/Mn | 5.0 | 5.0 | 4.9 | 4.0 | 4.4 | 3.95 | 5.3 | | |
| Density g/cm$^3$ | 0.960 | | 0.958 | 0.947 | | | | 0.958 | |

The total pressure of the 3 liter reactor is 15 bars, DEAC = diethylaluminium chloride, TEA = triethylaluminium chloride
(*) Copolymerization with 4-methyl-1-pentene